April 18, 1967        A. MINELLA        3,314,086

CONCEALED POP-UP VALVE FOR WASTE DRAINS

Filed Sept. 30, 1965

Angelo Minella
INVENTOR.

BY Hayden & Pravel

ATTORNEYS

United States Patent Office 3,314,086
Patented Apr. 18, 1967

3,314,086
CONCEALED POP-UP VALVE FOR WASTE DRAINS
Angelo Minella, Houston, Tex., assignor to A. Minella Plumbing Supplies, Inc., a corporation of Texas
Filed Sept. 30, 1965, Ser. No. 491,770
3 Claims. (Cl. 4—287)

This invention relates to new and useful improvements in a valve seat and push rod or stem for a pop-up waste valve concealed in a tamper-proof housing positioned below strainer means for preventing hair, lint, buttons, tube caps, and other small articles from passing through the valve to the waste line.

The present invention relates to an improvement in the inventions in applications Ser. No. 401,518, filed Oct. 5, 1964, and entitled, "Concealed Pop-Up Valve for Waste Drains" and Ser. No. 369,974, filed May 25, 1964, and entitled "Concealed Pop-Up Waste Valve."

One object of the present invention is to provide a drain-valve assembly including a valve mounted on a stem extending through trash-screening means wherein the stem and co-operating structure maintains the valve in an ever ready position for upward movement.

Another object of this invention is to provide a new and improved waste-drain assembly in which the push rod or stem mounting the valve within the assembly is guided relative to the releasable securing means while always having the proper rotational position relative to the securing means.

A further object of this invention is to provide, in a waste-drain assembly, a valve mounted on a stem of tapered noncircular cross section extending through an opening constructed to guide the stem to lock against a shoulder at the lower end of the stem to open the valve.

Still a further object of this invention is to provide a new and improved drain assembly having a tubular member with a rolled peripheral lip and protruding annular flange adapted to receive a seal member thereagainst at the urging of a hollow, cylindrical member for sealing the valve of this invention against leakage.

One object of this invention is to provide a new and improved waste-drain assembly having a tubular member with a rolled, peripheral lip serving as a valve seat for the valve in the assembly.

Figure 1:
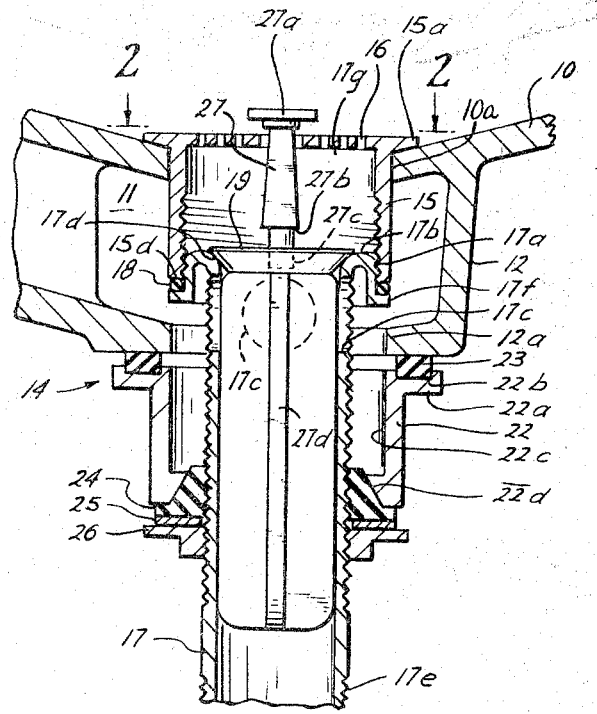
Figure 2:
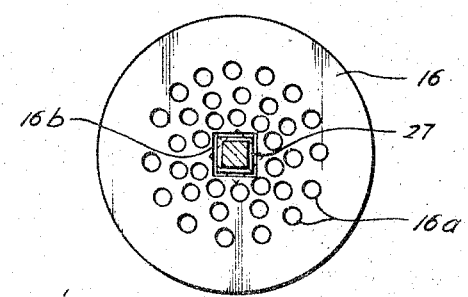
Figure 3:
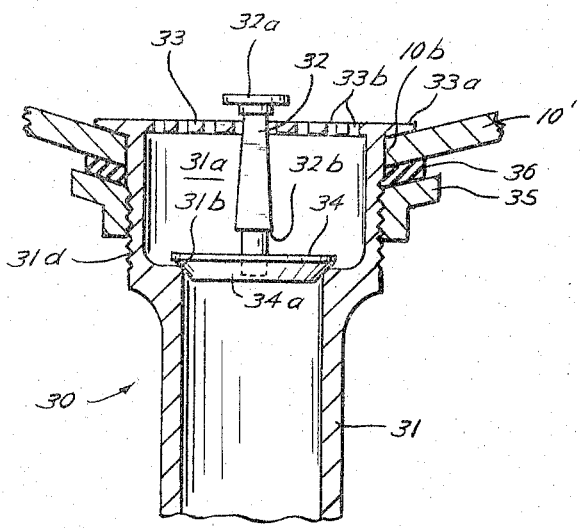

Other objects and advantages of the present invention will become readily apparent from a consideration of the following description and drawings wherein:

FIG. 1 is a sectional view of one embodiment of the present invention installed in the waste opening of a lavatory or the like having an overflow interconnected with the assembly and which illustrates the valve in the closed position relative to the valve seat;

FIG. 2 is a view taken along the line 2—2 of FIG. 1 which illustrates one form of a foraminated cover used for screening solid matter from the liquid passing therethrough and which also illustrates means maintaining the valve rod ever ready for upward movement without initial relative rotation; and FIG. 3 is a sectional view of another embodiment of this invention installed in the waste drain opening of a lavatory having no overflow means.

In FIG. 1, the lower portion of a sink 10 or other similar receptacle is illustrated as having a centrally located drain opening 10a for draining waste liquid from the receptacle 10 to a tubular member 17 that connects with a waste trap (not shown) in a manner well known in the art. The lavatories or similar receptacles 10 include an overflow opening (not shown) located to drain liquid from the container and thereby prevent overflow of the container. The overflow opening is communicated by means of a duct 11 generally formed by the walls 12 appended to the lower side of the lavatory or receptacle 10 which conduit 11 also includes a centrally located and axially aligned opening 12a beneath the drain opening 10a of the lavatory.

The concealed pop-up, waste-valve assembly illustrated generally at 14 in FIG. 1 is mounted relative to the openings 10a and 12a of the lavatory as shown in FIG. 1. The assembly 14 is shown as including a hollow, cylindrical member 15 having an outwardly extending annular flange 15a encircling one end thereof. The flange 15a is adapted to contact the surface of the receptacle 10 adjacent the drain opening 10a and is contoured to seal against the receptacle and prevent the leakage of liquid between the opening 10a and the member 15. The upper end of the cylindrical body 15 is closed by trash-screening means 16, better illustrated in the view of FIG. 2, which has the preferred form of a foraminated disc with openings 16a provided for liquid drainage. Centrally of the foraminated cover 16 is located a rectangular and preferably square opening 16b whose function will be made more apparent hereinafter.

The cylindrical body 15 is extended by the tubular member 17 which is engaged therewith by suitable means such as threads 17a. The member 17 includes side opening means 17c positioned below the valve member as will be described for conducting fluid from the overflow passage or duct 11, through the opening 12a and into the member 17. The lower portion of the member 17 is threaded at 17e for connection to the waste trap and with a sewerage drainage system in a manner well known in the art.

The upper end of the tubular member is outwardly rolled at 17b as shown in FIG. 1 of the drawings to form a peripheral lip 17d extending annularly of the tubular member 17 to provide a valve seat as will be described in greater detail. The member is extended around to form an encircling upright flange 17f below the threaded means 17a, illustrated in FIG. 1. The threads 17a extend along the length of the rolled portion but stop short of the upright flange 17f for receiving a seal member 18 between the upstanding flange 17f and the lower end 15d of the cylindrical body 15 to effect a waterproof seal therebetween. The valve seat flared on the tubular member 17 may be slightly chamfered, if desired, to provide a conforming surface co-operating with the valve as will be described in greater detail hereinafter.

The member 17 does not seal against the radius of the overflow opening 12a but fits loosely therein to thereby engage a lavatory conduit 11 of any size. An adapter 22 is positioned around the member 17 and has an upright flange 22a having a small groove 22b therein for receiving a seal ring 23 and securing same against the nether side of the overflow conduit 11. The adapter 22 has an internal bore 22c which is larger than the diameter of the member 17 so that overflow liquids may easily flow from duct 11 through opening 12a and into the openings 17c in member 17. A tapered washer 24 and friction ring 25 are forced against the lower, tapered opening 22d of the adapter 22 and are maintained in sealing relationship therewith by a rotatable lock nut 26 which is adapted to be threaded on the threads formed on the exterior, lower portion of member 17.

The body 15 and the member 17 co-operate to define a valve chamber 17g for receiving a valve 19 therein. The valve 19 is threadedly connected to a valve rod 27 at 27c and extends upwardly through the centrally located opening 16b of the foraminated cover 16. The valve rod 27 has an enlargement 27a on its exposed end for manipulation of the valve 19. The valve rod 27 also includes a locking shoulder 27b which is formed on the valve rod but spaced from the valve 19 to enable the valve 19 to be retained in open position on movement of the valve upwardly in the chamber 17g for engaging the shoulder 27b with the opening means 16b extending concentrically about and being sufficiently larger than the valve rod to allow movement of the valve rod to a locking position.

As will be observed in the drawings, the valve rod 27 is of noncircular construction and preferably has four surfaces along its longitudinal length as shown in FIGS. 1 and 2 with each of the four surfaces tapering from the upper end adjacent to the enlargement 27a to a larger cross-sectional area at the lower end adjacent the shoulder 27b. Since the opening means 16b is concentric with respect to the noncircular valve rod and sufficiently larger to permit relative movement in opening and closing the valve 19 relative to its seat 17d, it may be appreciated that the valve mechanism 14 of this invention is ever ready to be opened by the simple expedient of grasping and lifting the enlargement 27a whereby linear movement of the valve rod 27 through the opening 16b is constrained with respect to relative rotation until the shoulder 27b clears the upper surface of the foraminated member 16. At this juncture, relative rotation of the enlargement 27a in either direction places the shoulder on the foraminated cover to hold the valve member open relative to the valve seat.

Guidance of the valve 19 relative to the valve seat 17d is provided by means extending beneath the valve member 19, such as the perpendicularly extending, circumferentially spaced guide vanes 27d contacted against the interior wall of the member 17. It may be appreciated that while four guide vanes 27d are implied by FIG. 1 for aligning the valve 19 relative to the valve seat 17b, other guide means may be utilized to achieve the guidance necessary to bring the valve and valve seat into sealing relationship with one another.

In operation, the drainage valve assembly of this invention is installed in the illustrated relationship in the drain opening of the lavatory or other similar receptacle.

The drain assembly illustrated in FIG. 1 is installed with the annular flange 15a conforming and seating against the surface of the lavatory 10 whereupon the adapter 22 and seal ring 23 are placed against the lower surface of the overflow conduit 11 and sealed in position by means of the tapered washer 24, the friction ring 25, and the lock nut 26. The sealing contact of the adapter 22 against the seal ring 23 and the tapered washer 24, which is placed between the adapter 22 and the tubular member 17, provides leakproof means whereby liquid may overflow the lavatory 10 into the conduit 11, the passage 12a, and the side inlet means 17c without mishap.

Conventional drainage of liquid from the receptacle 10 through the body 15 and the tubular member 17 and then to the waste trap (not shown) is controlled by manipulating the enlargement 27a to lift the valve rod 27 relative to the foraminated cover 16 to move the shoulder means 27b through the opening 16b in the cover 16. When the shoulder means 27b has moved through the opening 16b, the valve rod 27 may be rotated in either direction to cross position the corners of the shoulder 27b relative to the concentric, noncircular opening means 16b in the cover to thereby retain the valve 19 in elevated position relative to the valve seat 17d. The waste fluid from the receptacle 10 may then drain through the foraminated cover 16 and into the valve chamber 17g, and since the valve 19 is lifted clear of the valve seat 17d to permit unrestricted flow into the tubular member 17, drainage is completed to the waste disposal system. It should be observed that the foraminated cover 16 collects small articles including lint, hair, bottle or tube caps, and even items of value on the upper surface of the cover within easy access for cleaning or retrieval. The cover 16 may be concave or convex although it is shown as a planar device in the preferred embodiment.

It may be appreciated that the shoulder means and concentric opening in the foraminated cover co-operate as means for releasably securing the valve 19 in the open position in the valve chamber 17g in spaced relation to the valve seat 17d to permit the flow of waste liquids therethrough. Vertical movements of the valve 19 are guided by the guide vanes 27d projecting outwardly below the valve as said vanes are moved interiorly of the member 17. Waste liquids are translated through the hollow cylindrical body past the guide vanes 27d and are carried away by the waste system connected thereto.

Should it be desired to close off the drain opening of the receptacle 10, enlargement 27a is rotated to align the corners of the guide rod 27 with the corners of the opening 16b whereupon the valve rod and the valve 19 carried thereon is dropped to the illustrated position of FIG. 1 with the valve 19 seated against the chamfered surface 17d. The lavatory 10 is sealed to prevent the further flow of liquid through the waste opening in accordance with the desires of those using such lavatory except the liquid is disposed by means of the conduit 11 on the overflow of the receptacle. On occurrence of overflow, liquid flows through the overflow conduit 11 and such liquid is conducted by the conduit 11 into the inner bore of the adapter 22 and through the side opening means 17c. Such overflow is then disposed of by the sewerage disposal system without regard of whether the valve 19 is opened or closed.

FIG. 3 illustrates an additional embodiment 30 of the present invention wherein a portion 10' of a lavatory having no overflow means is illustrated as providing a waste opening 10b. The waste valve assembly 30 is received in the waste opening 10b and includes a cylindrical member 31 extending through and opening upwardly into the basin 10'. The open, upper end of the member 31 is joined to a circular plate-like member 33 and is soldered or otherwise joined thereto to provide an outwardly extending flange 33a. The flange 33a is adapted to conform with the receptacle 10' and provide a seat for the embodiment 30 whereby leakage along the exterior of the waste valve 30 is prevented. The member 33 includes a plurality of openings 33b which assist in defining a foraminated closure member for draining liquid from the receptacle 10'.

The member 31 is threaded on its exterior surface at 31d near the upper end for receiving a lock nut 35 thereabout which is carried against a seal member 36 contacted against and sealed with the lower surface of the lavatory 10'.

The member 31 defines a valve chamber 31a for receiving a valve member 34 therein threadedly connected to a valve rod 32. The valve rod 32 extends through the circular member 33 in a manner similar to that disclosed in FIGS. 1 and 2, and is similar in providing a preferably square shaft extending through a concentric opening in the foraminated cover 33. The valve rod includes an enlargement 32a above the cover 33 for ease of grasping and manipulation, and it also includes a shoulder 32b located somewhat above the valve 34 which is adapted to be cross positioned relative to the preferably square opening in the cover 33.

The valve 34 includes a chamfered shoulder 34a contacted against a valve seat 31b formed interiorly of the member 31 and below the valve chamber 31a. The valve seat is indicated in the sectional view of FIG. 3 at a reduction in diameter of the member 31, it being appreciated that the valve chamber 31a thereabove is of somewhat greater diameter than the valve 34 therein. The valve chamber 31a and the chamfered seat 31d assist the valve 34 in achieving a sealed position to the flow of waste drainage from the lavatory 10' when the valve rod 32 is positioned concentrically of the opening in the foraminated cover 33. As noted from the drawings, the valve rod 32 is threadedly connected to the valve member 34.

The embodiment 30 illustrated in FIG. 3 is installed in a lavatory or other waste receptacle by positioning the cylindrical member 31 in the waste opening 10b and thereafter soldering or otherwise attaching the foraminated cover 33 thereto. On pulling the lock nut 35 tight against the seal member 36, the projecting flange 33a of the cover 33 is seated against the basin or other receptacle to define a leakproof structure whereby waste liquids are drained from the lavatory 10′ and into waste valve 30 of this invention. The waste valve assembly 30 illustrated in FIG. 3 is operated in a manner similar to that of the embodiment 14 illustrated in FIG. 1 by manipulation of the valve rod 32 which serves as means for moving the valve 34 relative to the valve seat 31b to thereby control the flow of liquid through the cylindrical member 31 to the waste line. It is worthy of mention that the valve rod 32 and the foraminated cover 33 provided in the embodiment 30 co-operate in the same manner as the previously described valve rod and foraminated cover included in the embodiment 14 and also illustrated in FIG. 2. Reference is made to the foregoing for an understanding of operation of the valve rod and associated valve securing means illustrated in FIG. 3.

It will be noted that in all forms of the invention, the valve is below a strainer and engages a valve seat above the overflow outlet to the waste line so as to not interfere with normal flow through the overflow to the drain.

Broadly, this invention relates to new and useful improvements in a concealed drain-valve assembly placed in a tamper-proof structure where drainage of liquids through the valve is not restricted and wherein trash and small articles of value do not pass through the drain. In addition, this invention discloses improvements in valve actuating means providing a valve ever ready for upward movement without searching rotation preliminary to actuation and also includes improvements in valve seat construction.

What is claimed is:

1. A concealed pop-up waste valve for receptacles having an overflow drain comprising:
   (a) a hollow cylindrical body;
   (b) an annular flange adjacent one end of said body for seating said cylindrical body in a receptacle waste opening;
   (c) a foraminated cover extending across one end of said cylindrical body;
   (d) a tubular member of smaller diameter substantially throughout its longitudinal extent than said cylindrical member;
   (e) said tubular member having its upper end outwardly rolled to form a peripheral lip extending annularly of said tubular member to form a valve seat;
   (f) threaded means on the outer periphery of said rolled end of said tubular member and on said cylindrical member whereby said cylindrical member and tubular member may be connected together;
   (g) a valve within said hollow cylindrical member for seating on said valve seat;
   (h) means for lifting said valve off said seat to open the receptacle waste opening;
   (i) valve aligning means depending from said valve and contacting said tubular member at circumferentially spaced points to guide said valve; and
   (j) said tubular member having at least one opening therein below said seat for communicating with the overflow drain of the receptacle.

2. The invention of claim 1 wherein said means for lifting said valve off said seat includes a valve rod secured to said valve and extending upwardly through a substantially square opening formed in said foraminated cover, said rod having an enlargement on the exposed end thereof and a shoulder formed thereon spaced from the valve, and wherein said valve rod includes four surfaces extending along its longitudinal extent each of which tapers from adjacent the enlargement downwardly to form a larger cross-sectional area on the rod adjacent said shoulder on said rod whereby said enlargement may be manually grasped and the valve rod lifted through said opening in said cover and rotated to seat said shoulder on said cover to hold said valve in open position.

3. The invention of claim 1 including seal means between said cylindrical body and said upper outwardly rolled end of said tubular member.

References Cited by the Examiner
UNITED STATES PATENTS

| | | | |
|---|---|---|---|
| 1,773,547 | 8/1930 | Robertson | 4—287 |
| 2,662,230 | 12/1953 | Borman | 4—287 |
| 2,989,758 | 6/1961 | Turek | 4—203 |

FOREIGN PATENTS 62,652    8/1924    Sweden.

LAVERNE D. GEIGER, *Primary Examiner.*

B. KILE, *Assistant Examiner.*